US012810151B2

(12) United States Patent
Kim et al.

(10) Patent No.: US 12,810,151 B2
(45) Date of Patent: Nov. 24, 2026

(54) LEARNING SKILL EVALUATION METHOD, APPARATUS, AND SYSTEM

(71) Applicant: Socra AI Inc., Seoul (KR)

(72) Inventors: Min Sam Kim, Seoul (KR); June Young Park, Yongin-si (KR); Chan Bae, Seoul (KR); Jin Eon Baek, Seoul (KR)

(73) Assignee: Socra AI Inc., Seoul (KR)

( * ) Notice: Subject to any disclaimer, the term of this patent is extended or adjusted under 35 U.S.C. 154(b) by 859 days.

(21) Appl. No.: 18/080,316

(22) Filed: Dec. 13, 2022

(65) Prior Publication Data

US 2023/0186088 A1 Jun. 15, 2023

(30) Foreign Application Priority Data

Dec. 14, 2021 (KR) ........................ 10-2021-0178858

(51) Int. Cl.
*G06N 3/08* (2023.01)

(52) U.S. Cl.
CPC ...................................... *G06N 3/08* (2013.01)

(58) Field of Classification Search
CPC .......... G06N 3/08; G06N 3/082; G06N 20/00; G06Q 50/20; G09B 7/02
See application file for complete search history.

(56) References Cited

U.S. PATENT DOCUMENTS

2015/0170536 A1* 6/2015 Lan ........................ G06N 20/00 434/350
2020/0320411 A1* 10/2020 Hebenthal ................ G06N 5/04
2023/0138245 A1* 5/2023 Tamano ................... G09B 7/02
2024/0020581 A1* 1/2024 Idesawa ................... G06N 3/08

FOREIGN PATENT DOCUMENTS

JP 2017-3673 A 1/2017
KR 10-2096301 B1 4/2020
KR 10-2021-0105272 A 8/2021

OTHER PUBLICATIONS

Ding, Xinyi. "Deep Neural Network Based Student Response Modeling With Uncertainty, Multimodality and Attention." (2020). (Year: 2020).*
Yeung, Chun-Kit. "Deep-IRT: Make deep learning based knowledge tracing explainable using item response theory." arXiv preprint arXiv:1904.11738 (2019). (Year: 2019).*
Korean Office Action dated Nov. 29, 2023 in Application No. 10-2021-0178858.

* cited by examiner

*Primary Examiner* — Matthew Ell
*Assistant Examiner* — Humaira Zahin Mauni
(74) *Attorney, Agent, or Firm* — USX IP LLC

(57) ABSTRACT

Provided is a method of training a neural network model for calculating an uncertainty index, the method including: obtaining a reference answering data set of a plurality of reference users, calculating expected score information of the reference user from the reference answering data set; obtaining actual score information of the reference user; obtaining a training set on the basis of the reference answering data set, the expected score information, and the actual score information, the training set including label information that is defined as a difference between the expected score information and the actual score information; and training a first neural network model for calculating an uncertainty index related to accuracy of the expected score information of the reference user from the reference answering data set using the training set.

3 Claims, 9 Drawing Sheets

LEARNING SKILL EVALUATION METHOD, APPARATUS, AND SYSTEM

CROSS-REFERENCE TO RELATED APPLICATION

This application claims priority to and the benefit of Korean Patent Application No. 10-2021-0178858, filed on Dec. 14, 2021, the disclosure of which is incorporated herein by reference in its entirety.

BACKGROUND

1. Field of the Invention

The present application relates to a learning skill evaluation method, apparatus, and system. Specifically, the present application relates to a learning skill evaluation method, apparatus, and system for quantifying uncertainty about arbitrary information calculated on the basis of answering data of a learner.

2. Discussion of Related Art

With the development of artificial intelligence (AI) technology, attention has been drawn to the field of education technology in which learners' skills are diagnosed and educational content is recommended on the basis of the diagnosis results. In particular, with the demand for technology for providing optimal educational content for learners of each skill level, there is an increasing demand for a technology for accurately and objectively quantifying the skill of a learner.

On the other hand, item response theory (IRT) is generally used as a method of calculating uncertainty about arbitrary information. IRT employs statistical techniques to calculate uncertainty about specific information. However, when uncertainty about skill information of a learner is calculated by applying IRT employing statistical techniques to technology for quantifying a learner's skill information using AI technology, limitations in terms of accuracy and speed of the calculation arise.

Accordingly, there is a need to develop a learning skill evaluation method, apparatus, and system that are capable of quantifying not only skill information of a learner but also uncertainty about the skill information of the learner.

SUMMARY OF THE INVENTION

The present invention is directed to providing a learning skill evaluation method, apparatus, and system that are capable of quantifying uncertainty about information related to a skill of a learner calculated from answering data of the learner.

The present invention is directed to providing a learning skill evaluation method, apparatus, and system that are capable of generating a diagnostic problem set composed of problems for reducing uncertainty.

The technical objectives of the present invention are not limited to the above, and other objectives may become apparent to those of ordinary skill in the art based on the following descriptions.

According to an aspect of the present invention, there is provided a method of training a neural network model for calculating an uncertainty index, the method including: obtaining a reference answering data set of a plurality of reference users, the reference answering data set including problem data solved by the reference user and response data of the reference user to the problem data; calculating expected score information of the reference user from the reference answering data set; obtaining actual score information of the reference user; obtaining a training set on the basis of the reference answering data set, the expected score information, and the actual score information, the training set including label information that is defined as a difference between the expected score information and the actual score information; and training a first neural network model for calculating an uncertainty index related to accuracy of the expected score information of the reference user from the reference answering data set using the training set.

According to an aspect of the present invention, there is provided a method of calculating an uncertainty index, the method including: obtaining target answering data of a target user, the target answering data including problem data previously solved by the target user and response data of the target user to the problem data; obtaining an expected score of the target user calculated on the basis of the target answering data; obtaining a first neural network model configured to calculate accuracy of the expected score on the basis of the target answering data and the expected score; and obtaining an uncertainty index related to the accuracy of the expected score using the first neural network model.

The technical solutions of the present invention are not limited to the above, and other solutions may become apparent to those of ordinary skill in the art based on the following description.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
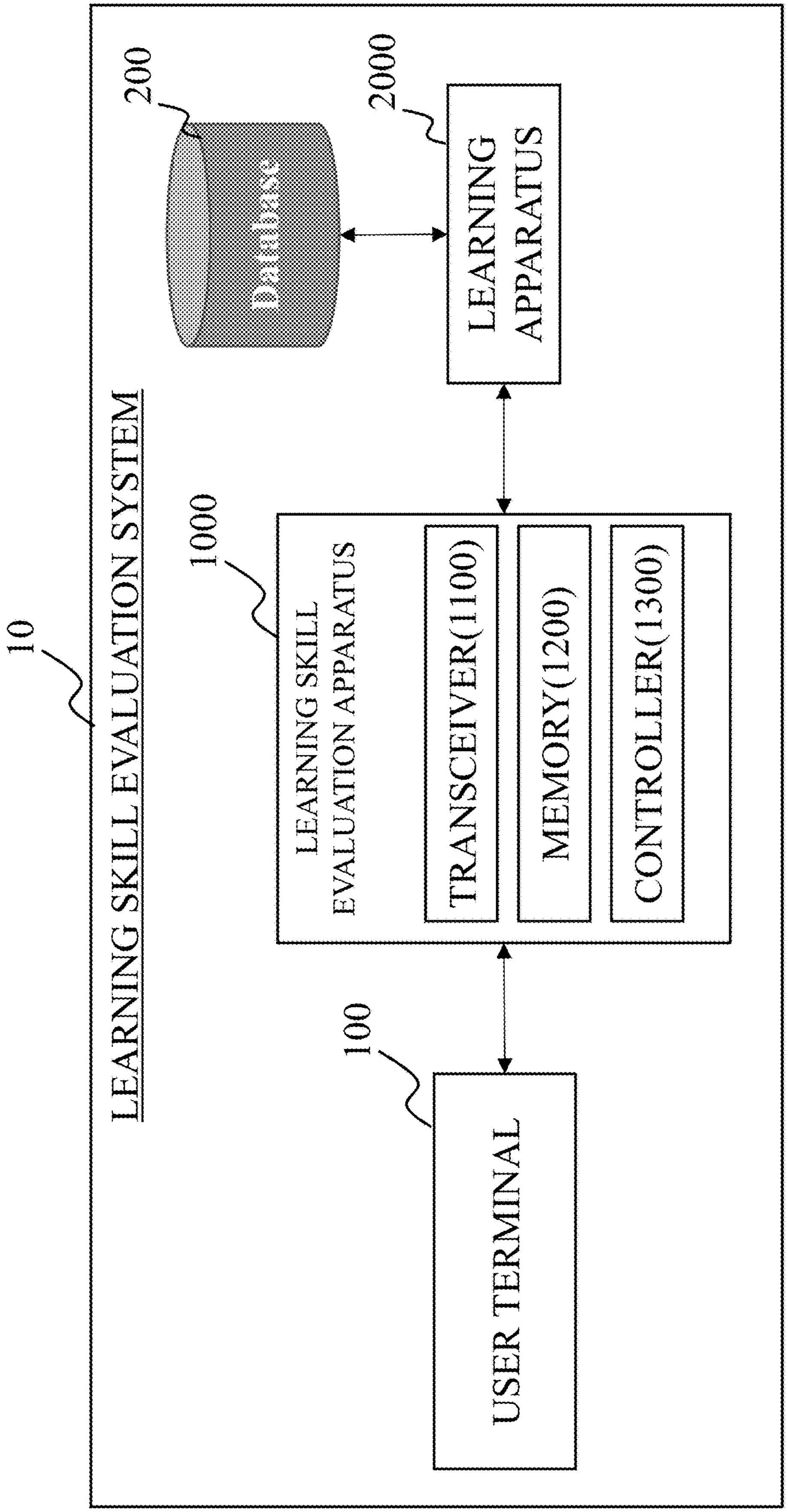
FIG. 1 is a schematic diagram illustrating a learning skill evaluation system according to an embodiment of the present application.

The above objects, features and advantages of the present invention will become more apparent from the following detailed description taken in conjunction with the accompanying drawings. The present invention may be modified in various ways and may have various embodiments. Hereinafter, specific embodiments will be illustrated in the drawings and described in detail.

In the following description, the same reference numerals are used to designate the same elements in principle. In addition, elements having the same function within the scope of the same idea shown in the drawings of each embodiment will be described using the same reference numerals, and the same description will be omitted.

In addition, when it is determined that the detailed description of a known function or configuration related to the present invention may unnecessarily obscure the subject matter of the present invention, the detailed description thereof will be omitted. In addition, a numeral (e.g., first, second, etc.) used in the description of the present invention is merely an identifier for distinguishing one component from another component.

The names "module" and "unit" for components used in the following description are given or used together in consideration of ease of specification and do not have distinct meanings or roles from each other.

In the embodiments below, the singular forms "a," "an," and "one" are intended to include the plural forms as well, unless the context clearly indicates otherwise.

It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

In the accompanying drawings, the size of each component shown in the drawings can be exaggerated or reduced for the sake of convenience in description.

When an embodiment is otherwise implementable, specific processes may be performed in an order different from a described order. For example, two processes described in succession may be performed concurrently or in reverse order.

It should be understood that when an element is referred to as being "connected" to another element, the element may be directly connected to another element or indirectly connected to another element with intervening elements.

For example, when an element is referred to as being electrically connected to another element, the electrical connection may be direct or indirect with intervening elements.

A method of training a neural network model for calculating an uncertainty indicator according to an embodiment of the present application may include: obtaining a reference answering data set of a plurality of reference users, the reference answering data set including problem data solved by the reference user and response data of the reference user to the problem data; calculating expected score information of the reference user from the reference answering data set; obtaining actual score information of the reference user; obtaining a training set on the basis of the reference answering data set, the expected score information, and the actual score information, the training set including label information that is defined as a difference between the expected score information and the actual score information; and training a first neural network model for calculating an uncertainty index related to accuracy of the expected score information of the reference user from the reference answering data set using the training set.

According to the embodiment of the present application, the first neural network model may include an input layer for receiving the reference answering data set, an output layer for outputting an output value related to the uncertainty indicator, and a hidden layer having a plurality of nodes connecting the input layer to the output layer.

According to the embodiment of the present application, the training of the first neural network model may include: inputting the reference answering data set to the input layer; obtaining the output value related to the uncertainty indicator through the output layer; and adjusting a weight of at least one node among the plurality of nodes on the basis of the output value and the label information.

According to an embodiment of the present application, the uncertainty indicator may be provided in the form of at least one of an error value between the expected score information of the reference user and the actual score information of the reference user, a reliability of the error value, and a probability value that the expected score information matches the actual score information.

According to the embodiment of the present application, a computer recording medium on which a program for executing the method of training the neural network model for calculating the uncertainty index is recorded may be provided.

A method of calculating an uncertainty index according to an embodiment of the present application includes: obtaining target answering data of a target user, the target answering data including problem data previously solved by the target user and response data of the target user to the problem data; obtaining an expected score of the target user calculated on the basis of the target answering data; obtaining a first neural network model configured to calculate accuracy of the expected score on the basis of the target answering data and the expected score; and obtaining an uncertainty index related to the accuracy of the expected score using the first neural network model.

According to the embodiment of the present application, the first neural network model may include an input layer for receiving the target answering data and the expected score, an output layer for outputting the uncertainty indicator of the expected score, and a hidden layer having a plurality of nodes connecting the input layer to the output layer.

According to the embodiment of the present application, the first neural network model may be trained such that a weight of at least one node among the plurality of nodes is adjusted on the basis of a training set including an answering data set of a plurality of reference users, a reference expected score of the reference user, and a reference actual score of the reference user, to output label information defined as a difference between the reference expected score and the reference actual score.

According to the embodiment of the present application, the expected score of the target user may be obtained through a second neural network model configured to receive the target answering data and output the expected score of the target user.

According to the embodiment of the present application, a computer recording medium on which a program for executing the method of calculating the uncertainty index is recorded may be provided.

Hereinafter, a learning skill evaluation method, a learning skill evaluation apparatus, and a learning skill evaluation system according to embodiments of the present application will be described with reference to FIGS. 1 to 9.

FIG. 1 is a schematic diagram illustrating a learning skill evaluation system 10 according to an embodiment of the present application.

The learning skill evaluation system 10 according to the embodiment of the present application may include a user terminal 100, a database 200, a learning skill evaluation apparatus 1000, and a learning apparatus 2000.

The user terminal 100 may obtain a problem database from the learning skill evaluation apparatus 1000, the database 200, or an arbitrary external device. For example, the user terminal 100 may receive some problems included in the problem database, and display the received problems to the user. Then, the user (or learner) may input responses to the suggested problems into the user terminal 100.

The user terminal 100 may obtain answering data on the basis of the response of the user, and transmit the answering data of the user to the learning skill evaluation apparatus 1000. Here, the concept of answering data may be understood to encompass information about the problem solved by the user, information about the response of the user to the problem, and/or information about whether the problem is correctly or incorrectly answered by the user, and the like. Meanwhile, the user terminal 100 may transmit identification information of the user and/or actual score information of the user related to a specific educational domain to the learning skill evaluation apparatus 1000.

Meanwhile, the user terminal 100 may receive expected score information and/or an uncertainty index of the expected score information calculated from the learning skill evaluation apparatus 1000. In addition, the user terminal 100 may receive expected correct answer rate information and/or an uncertainty index of the expected correct answer rate information calculated from the learning skill evaluation apparatus 1000. In addition, the user terminal 100 may receive education content generated on the basis of the expected score information, the expected correct answer rate, and/or the uncertainty index. In addition, the user terminal 100 may display the expected score information, the expected correct answer rate, the uncertainty index, and/or the educational content to the user. Here, the concept of educational content may be understood to encompass arbitrary education-related content, such as a web page related to learning, solution content about problems, and content about recommended problems including a diagnostic problem set.

The database 200 according to the embodiment of the present application may store various types of data of the learning skill evaluation system 10.

For example, the database 200 may store various types of data related to an arbitrary educational domain. For example, the database 200 may include arbitrary data, including problem data related to an arbitrary educational domain, response data of users to problems, correct/incorrect answer data of users to problems, correct answer rate data of users to problems, and/or score information of users in the education domain.

As another example, the database 200 may store various types of data related to the learning apparatus 2000. For example, the database 200 may store arbitrary data for executing a neural network model trained from the learning apparatus 2000, including weights (or parameter information) of nodes of the trained neural network model and/or execution data of the trained neural network model.

The learning skill evaluation apparatus 1000 according to the embodiment of the present application may perform an operation of quantifying uncertainty about learning skill evaluation information (e.g., an expected score or an expected correct answer rate, etc.), which is calculated from answering data of a target user, using a first neural network model for which training is completed from the learning apparatus 2000.

The learning skill evaluation apparatus 1000 according to the embodiment of the present application may include a transceiver 1100, a memory 1200, and a controller 1300.

The transceiver 1100 may communicate with an arbitrary external device including the user terminal 100, the database 200, and/or the learning apparatus 2000. For example, the learning skill evaluation apparatus 1000 may receive various types of data including answering data of a user and/or user identification information of the user from the user terminal 100, or transmit various types of data including expected score information of the user, an uncertainty index of expected score information and/or educational content to the user terminal 100 through the transceiver 1100. As another example, the learning skill evaluation apparatus 1000 may receive execution data of a neural network model from the learning apparatus 2000 through the transceiver 1100.

In addition, the learning skill evaluation apparatus 1000 may connect to a network through the transceiver 1100 to transmit and receive various types of data. Transceivers 1100 may be largely divided into wired type transceivers and wireless type transceivers. Since wired type transceivers and wireless type transceivers both have their strength and weaknesses, a wired type transceiver and a wireless type transceiver may be simultaneously provided in the learning skill evaluation apparatus 1000 in some cases. For the wireless type transceiver, a wireless local area network (WLAN)-based communication method, such as Wi-Fi, may be mainly used. Alternatively, for the wireless type transceiver, cellular communication, for example, Long-Term Evolution (LTE) or a 5G-based communication method may be used. However, the wireless communication protocol is not limited to the above-described example, and may employ arbitrary suitable wireless type communication methods. For the wired type transceiver, local area network (LAN) or Universal Serial Bus (USB) communication may be used as representative examples, and other methods are also possible.

The memory 1200 may be configured to store various types of information. Various types of data may be temporarily or semi-permanently stored in the memory 1200. Examples of the memory 1200 may include a hard disk drive (HDD), a solid state drive (SSD), a flash memory, a read-only memory (ROM), a random access memory (RAM), and the like. The memory 1200 may be provided in a form in which it is embedded in or detachable from the learning skill evaluation apparatus 1000. The memory 1200 may be configured to store various types of data required for operation of the learning skill evaluation apparatus 1000, including an operating system (OS) for driving the learning skill evaluation apparatus 1000 and a program for operating each component of the learning skill evaluation apparatus 1000.

The controller 1300 may control the overall operation of the learning skill evaluation apparatus 1000. For example, the controller 1300 may perform the overall operation of the learning skill evaluation apparatus 1000 including: an operation of obtaining target answering data of a target user; an operation of calculating an expected score and/or an operation of obtaining an uncertainty index related to the accuracy (or error) of the expected score using the first neural network model on the basis of the target answering data; an operation of generating a diagnostic problem set on the basis of the uncertainty index, and the like, which will be described below. Specifically, the controller 1300 may load a program for the overall operation of the learning skill evaluation apparatus 1000 from the memory 1200 and execute the program. The controller 1300 may be implemented as an application processor (AP), a central processing unit (CPU), or another similar device according to hardware, software, or a combination of hardware and software. In this case, as hardware, the controller 1300 may be provided in the form of an electronic circuit that processes electrical signals to perform a control function, and as software, may be provided in the form of a program or code for driving a hardware circuit.

The learning apparatus 2000 according to the embodiment of the present application may perform an operation of training a model configured to quantify uncertainty related to a user's learning skill evaluation information (e.g., expected score information, expected correct answer rate information, etc.). For example, the learning apparatus 2000 may obtain a model configured to output an uncertainty index indicating the accuracy or error of expected score information of a user on the basis of an answering data set of the user.

As an example, the learning apparatus 2000 may use a neural network model as the model for quantifying uncertainty. The neural network model may be provided as a machine learning model. Representative examples of the machine learning model may include an artificial neural network. Specifically, representative examples of the artificial neural network may include a deep learning-based artificial neural network including an input layer that receives data, an output layer that outputs a result, and a hidden layer that processes data between the input layer and the output layer. Specific examples of the artificial neural network include a convolution neural network, a recurrent neural network, a deep neural network, a generative adversarial network, and the like, and the concept of an artificial neural network according to the present specification should be understood to encompass all of the artificial neural networks described above, various other types of artificial neural networks, and combinations thereof, and the artificial neural network according to the present specification need not be a deep learning based artificial neural network.

In addition, the machine learning model does not need to be in the form of an artificial neural network model, and may further include a nearest neighbor algorithm (KNN), random forest (RandomForest), a support vector machine (SVM), principal component analysis (PCA), etc. Alternatively, the machine learning model may include an ensemble of the above-mentioned techniques or various combinations of the above-mentioned techniques. On the other hand, in the embodiments described based on an artificial neural network, the artificial neural network may be replaced with another machine learning model unless otherwise mentioned.

Furthermore, in the present specification, the algorithm for quantifying the uncertainty about a user's learning skill evaluation information is not limited to a machine learning model. That is, the algorithm for quantifying the uncertainty about a user's learning skill evaluation information may include various judgment/decision algorithms rather than a machine learning model. Therefore, in the present specification, the concept of the algorithm for quantifying the uncertainty about a user's learning skill evaluation information should be understood to encompass all types of algorithms for calculating an uncertainty index of learning skill evaluation information (e.g., score information or correct answer rate) of a user in an arbitrary form using answering data of the user. However, for the sake of convenience in description, the following description will be made in relation to an artificial neural network model.

The learning apparatus 2000 according to the embodiment of the present application may include a transceiver, a memory, and a controller. In this regard, the descriptions of the transceiver, the memory, and the controller of the learning skill evaluation apparatus 1000 described above may be employed by analogy, and details thereof will be omitted.

Meanwhile, in FIG. 1, the learning skill evaluation apparatus 1000 and the learning apparatus 2000 are illustrated as being separately configured. However, this is only an example, and the learning skill evaluation apparatus 1000 and the learning apparatus 2000 may be provided as one part.

Figure 2:
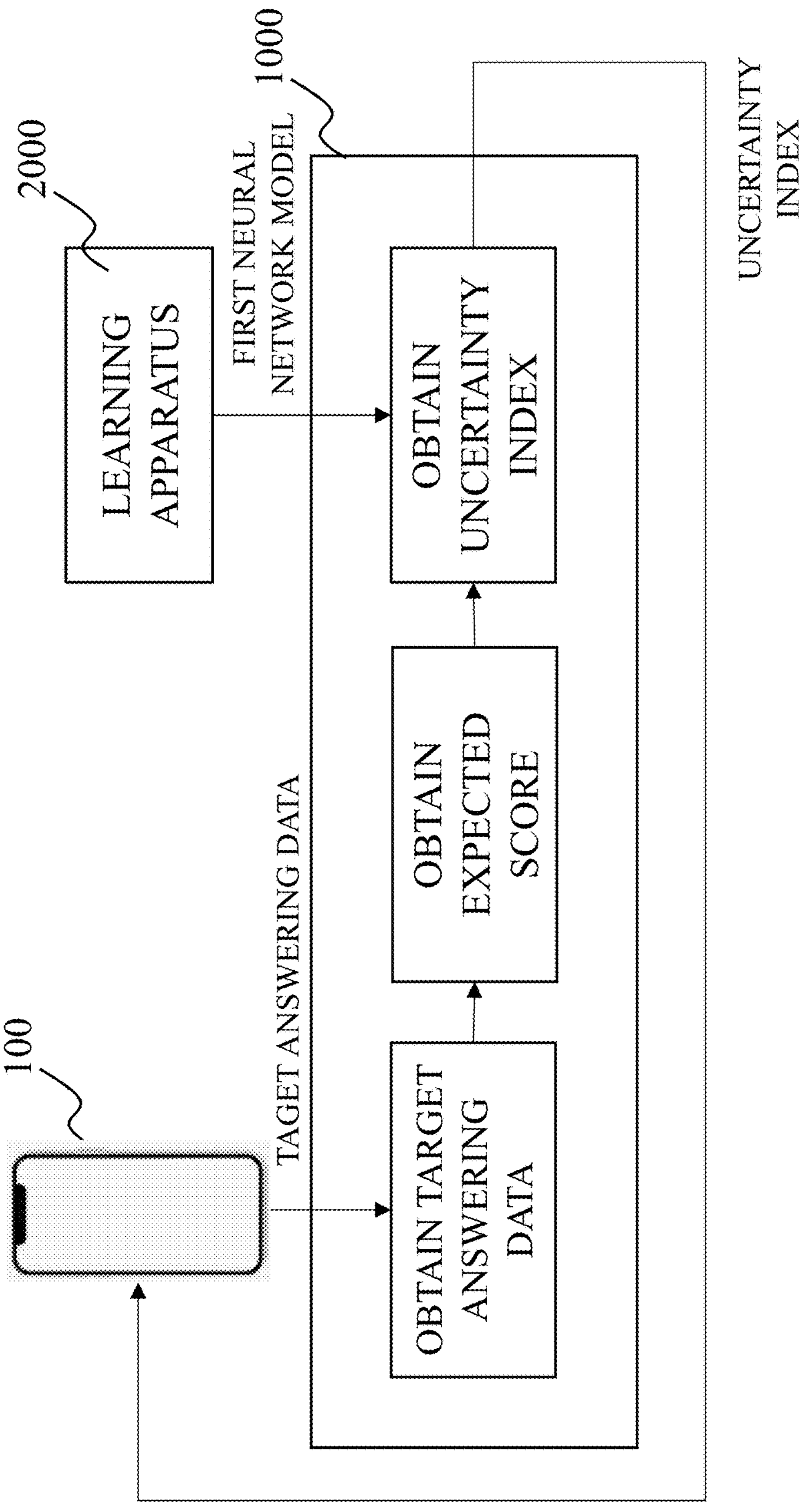
FIG. 2 is a diagram illustrating an operation of a learning skill evaluation system according to an embodiment of the present application.

Hereinafter, an operation of the learning skill evaluation apparatus 1000 of the learning skill evaluation system 10 according to the embodiment of the present application for achieving the above-described objects and effects will be described in detail with reference to FIG. 2. FIG. 2 is a diagram illustrating an operation of the learning skill evaluation system 10 according to the embodiment of the present application.

The learning skill evaluation apparatus 1000 of the learning skill evaluation system 10 according to the embodiment of the present application may obtain target answering data from the user terminal 100. The target answering data may include arbitrary data related to problem solving of a target user, including problem data, response data of the target user to the problem data, and/or correct/incorrect answer data of the target user to the problem.

The learning skill evaluation apparatus 1000 of the learning skill evaluation system 10 according to the embodiment of the present application may obtain an expected score of the target user.

As an example, the learning skill evaluation apparatus 1000 may obtain the expected score of the target user on the basis of the target answering data using a neural network model trained to output an expected score of a user from answering data. In more detail, the learning skill evaluation apparatus 1000 may obtain execution data for executing a neural network model for which training is completed and/or the neural network model. In addition, the learning skill evaluation apparatus 1000 may input the target answering data to an input layer of the neural network model, and may obtain an expected score of the target user output through an output layer of the neural network model.

However, this is only an example, and the learning skill evaluation apparatus 1000 may be configured to obtain expected score information of the target user calculated using an arbitrary algorithm from an arbitrary external device. The obtaining of the expected score of the target user from the target answering data will be described in more detail with reference to FIG. 7.

The learning skill evaluation apparatus 1000 according to the embodiment of the present application may obtain a first neural network model for which training is completed to output an uncertainty index related to the accuracy of expected score information on the basis of answering data. For example, the first neural network model may be trained from the learning apparatus 2000, and the learning skill evaluation apparatus 1000 may obtain arbitrary data for executing the first neural network mode, including execution data and/or weight data of nodes related to the first neural network model.

The learning skill evaluation apparatus 1000 according to the embodiment of the present application may obtain an uncertainty index related to the accuracy (or error) of the expected score of the target user by using the first neural network model. In detail, the learning skill evaluation apparatus 1000 may input the target answering data to the input layer of the first neural network model, and obtain an uncertainty index related to the expected score of the target user output through the output layer. Here, the concept of the uncertainty index may be understood to encompass any index quantified in an arbitrary form in relation to the accuracy or error of expected score information of a learner. For example, the uncertainty index may include a value related to a difference (or an error value) between expected score information of a learner and actual score information of the learner, the reliability of the error value, a probability value that the expected score information matches the actual score information, and/or the accuracy of the expected score information.

On the other hand, the uncertainty is not limited to the expected score as a target. As another example, the uncertainty may be that of an expected correct answer rate of a learner as a target. In more detail, the learning skill evaluation apparatus 1000 may perform an operation of calculating an expected correct answer rate of the target user for a problem on the basis of the target answering data. In this case, the learning skill evaluation apparatus 1000 may be configured to obtain an uncertainty index related to the accuracy (or the error) of the expected correct answer rate. Here, the uncertainty index of the expected correct answer rate may be an index quantified in an arbitrary form with respect to the accuracy of an expected correct answer rate of a learner to an arbitrary problem. For example, the uncertainty index may include a value related to the accuracy or the error probability of an expected correct answer rate of a learner to an arbitrary problem.

The obtaining of the uncertainty index will be described in more detail with reference to FIGS. 7 and 8.

Figure 3:
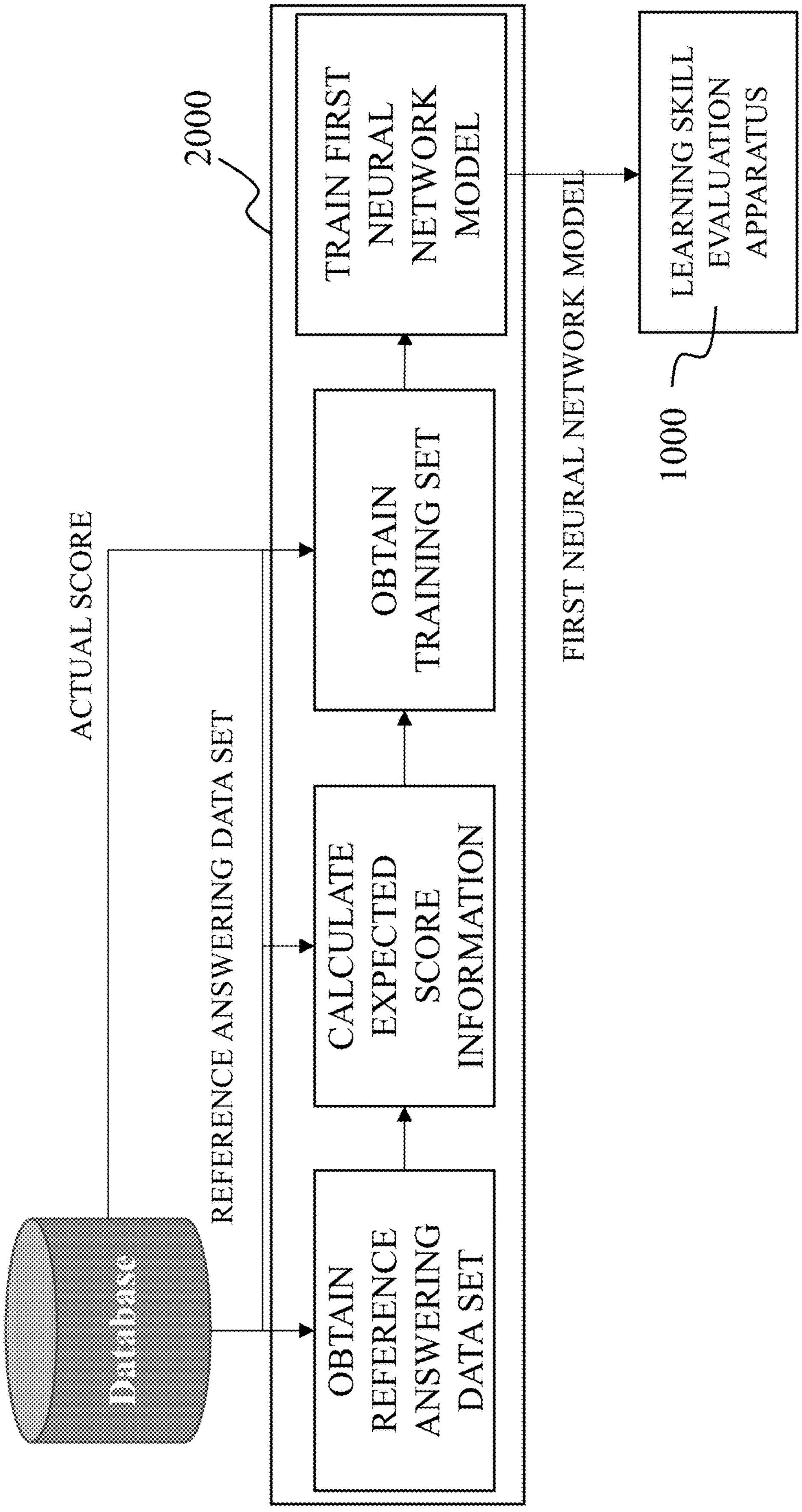
FIG. 3 is a diagram illustrating an operation of a learning apparatus according to an embodiment of the present application.

Hereinafter, an operation of the learning apparatus 2000 for acquiring the first neural network model according to the embodiment of the present application will be described in detail with reference to FIG. 3. FIG. 3 is a diagram illustrating an operation of the learning apparatus 300 according to the embodiment of the present application.

The learning apparatus 2000 according to the embodiment of the present application may obtain a reference answering data set of a plurality of reference users from the database 200. Here, the reference answering data set may include problem data solved by a plurality of users, response data of the reference user to the problem data, correct/incorrect answer data of the reference user, correct answer rates of the reference users to the problem data (e.g., an individual correct answer rate, an average correct answer rate, or an expected correct answer rate, etc.), expected score information of the reference user, and/or actual score information of the reference user. Here, the expected score information may be calculated on the basis of the problem data and the response data of the reference user for the problem data included in the reference answering data set. In addition, the actual score information may include an actual test score of the reference user for an educational domain related to the problem data solved by the reference user.

The learning apparatus 2000 according to the embodiment of the present application may obtain expected score information that quantifies the skill of the reference user from the reference answering data set.

As an example, the learning apparatus 2000 may obtain the expected score information of the reference user through the second neural network model that is trained to calculate the expected score information of the reference user from the reference answering data set. As another example, the learning apparatus 2000 may obtain the expected score information of the reference user calculated using an arbitrary algorithm in an arbitrary external device. This will be described in more detail with reference to FIGS. 4 and 7.

The learning apparatus 2000 according to the embodiment of the present application may obtain a training set for training the first neural network model. In more detail, the learning apparatus 2000 may train a reference neural network model using the training set. In this case, the learning apparatus 2000 may obtain the training set generated on the basis of the actual score information of the reference user and the expected score information of the reference user included in the reference answering data set. For example, the training set may include label information defined as a difference between the expected score information of the reference user and the actual score information of the reference user.

The learning apparatus 2000 according to the embodiment of the present application may perform an operation of training the first neural network model to calculate an uncertainty index related to the accuracy (or error) of the expected score information of the reference user from the reference answering data set using the training set. More specifically, the learning apparatus 2000 may train the first neural network model to receive the reference answering data set and output a value approximating the label information defined as the difference between the expected score information of the reference user and the actual score information of the reference user. The training of the first neural network model will be described in more detail with reference to FIGS. 4 to 6.

In addition, the learning apparatus 2000 according to the embodiment of the present application may transmit the first neural network model and/or arbitrary data for executing the first neural network model to the learning skill evaluation apparatus 1000 and/or the database 200.

In FIG. 3, the learning apparatus 2000 has been illustrated as performing all of the above-described operations. However, this is only an example, and at least some of the operations of the learning apparatus 2000 may be implemented to be performed by an arbitrary external device including the learning skill evaluation apparatus 1000, or an external server.

Figure 4:
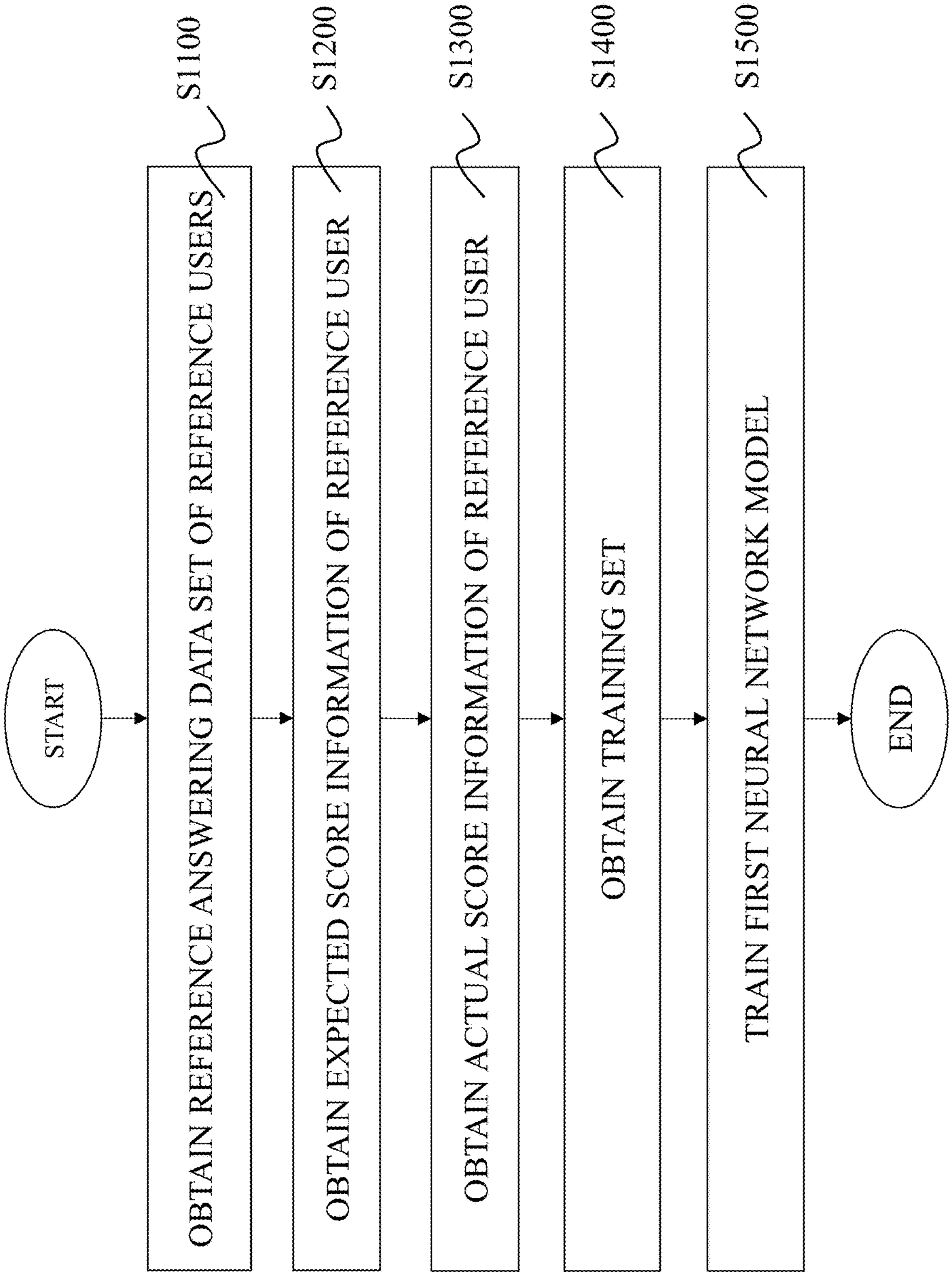
FIG. 4 is a flowchart showing a method of training a first neural network model according to an embodiment of the present application.

Hereinafter, a method of obtaining the first neural network model according to the embodiment of the present application will be described in detail with reference to FIG. 4. FIG. 4 is a flowchart showing a method of training the first neural network model according to an embodiment of the present application.

The method of obtaining the first neural network model according to the embodiment of the present application may include obtaining a reference answering data set of a plurality of reference users (S1100), obtaining expected score information of the reference user (S1200), obtaining actual score information of the reference user (S1300), obtaining a training set (S1400), and training the first neural network model (S1500).

In the obtaining of the reference answering data set of the plurality of reference users (S1100), the learning apparatus 2000 according to the embodiment of the present application may obtain a reference answering data set of a plurality of reference users from the database 200. Here, the reference answering data set may include problem data solved by the plurality of users, response data of the reference user to the problem data, correct/incorrect answer data of the reference user, correct answer rates of the reference users to the problem data (e.g., an individual correct answer rate, an average correct answer rate, an expected correct answer rate, etc.), expected score information of the reference user, and/or actual score information of the reference user.

In the obtaining of the expected score information of the reference user (S1200), the learning apparatus 2000 according to the embodiment of the present application may obtain an expected score of the reference user on the basis of the reference answering data set.

As an example, the learning apparatus 2000 may obtain expected score information of the reference user stored in the database 200.

As another example, the learning apparatus 2000 may calculate an expected score of the reference user on the basis of the reference answering data set. For example, the learning apparatus 2000 may obtain an expected score of the reference user by using the second neural network model trained to receive the reference answering data set and output an expected score of a user. In more detail, the learning apparatus 2000 may input the reference answering data set to an input layer of a second neural network model, for which training is completed, and obtain expected score information of the reference user that is output through an output layer of the second neural network model. A method of training the second neural network model will be described in more detail with reference to FIG. 7.

In the obtaining of the actual score information of the reference user (S1300), the learning apparatus 2000 according to the embodiment of the present application may obtain actual score information of the reference user. For example, a plurality of reference users may input actual score information through an arbitrary input unit (e.g., a touchpad, a mouse, a keyboard, etc.) of the user terminal 100. In this case, the learning apparatus 2000 may obtain the actual score information input from the user terminal 100. More specifically, the actual score information of the reference user input to the user terminal 100 may be stored in the database 200. In this case, the learning apparatus 2000 may obtain the actual score information of the reference user from the database 200.

In the obtaining of the training set (S1400), the learning apparatus 2000 according to the embodiment of the present application may obtain a training set generated on the basis of the reference answering data set, the expected score information of the reference user, and/or the actual score information of the reference user.

As an example, the training set may include label information generated on the basis of the expected score information of the reference user and the actual score information of the reference user. For example, the training set may include the label information defined as a difference between the expected score information of the reference user and the actual score information of the reference user. As another example, the training set may include the label information defined as accuracy of the expected score information of the reference user with respect to the actual score information of the reference user. As another example, the training set may include the label information defined as a probability that the expected score information of the reference user matches the actual score information of the reference user.

In the training of the first neural network model (S1500), the learning apparatus 2000 according to the embodiment of the present application may train the first neural network model using the training set. In more detail, the learning apparatus 2000 may train the first neural network model to calculate an uncertainty index related to the accuracy (or error) of the expected score information of the reference user from the reference answering data set.

Figure 5:
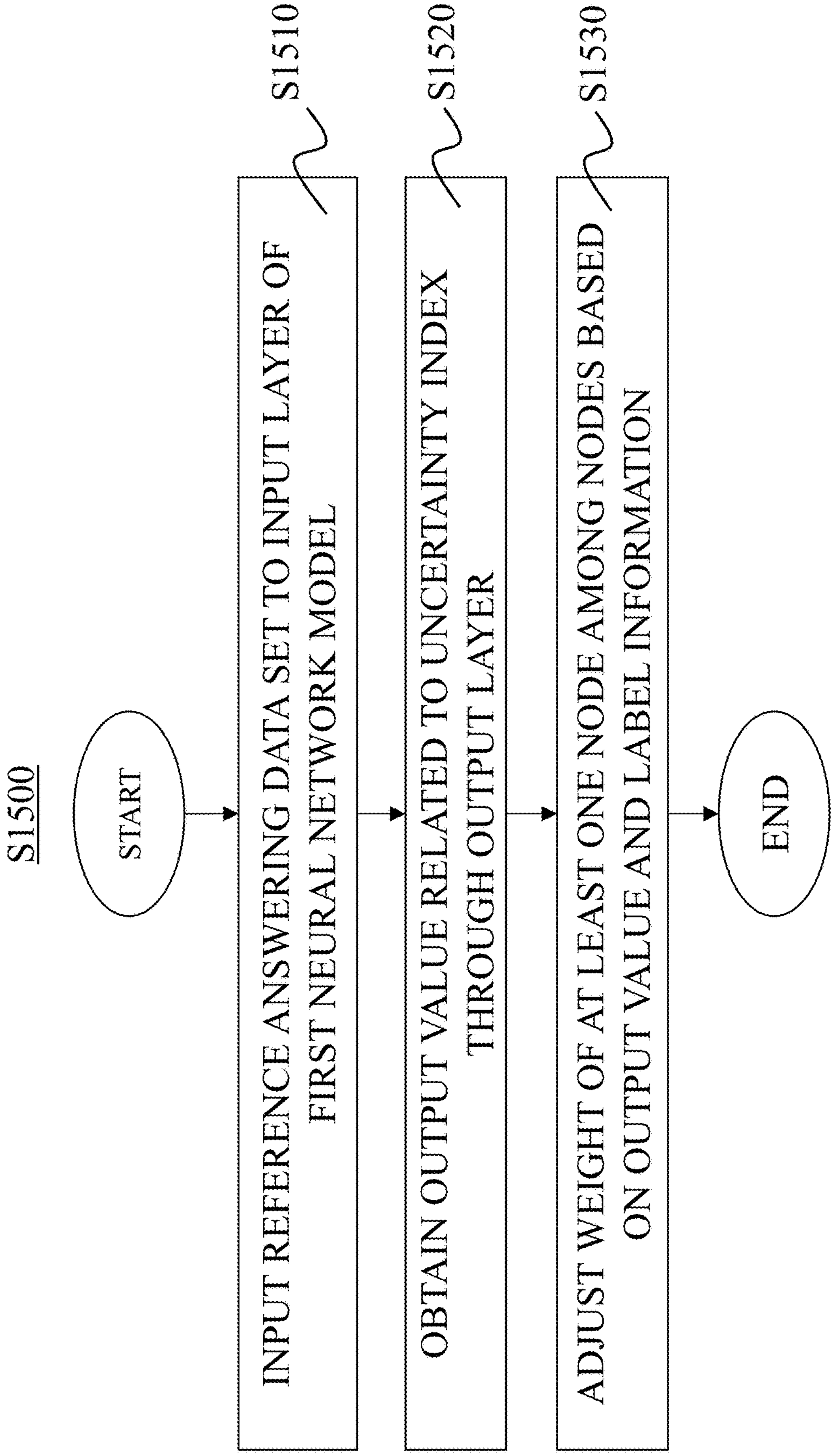
FIG. 5 is a flowchart showing details of a method of training a first neural network model according to an embodiment of the present application.
Figure 6:
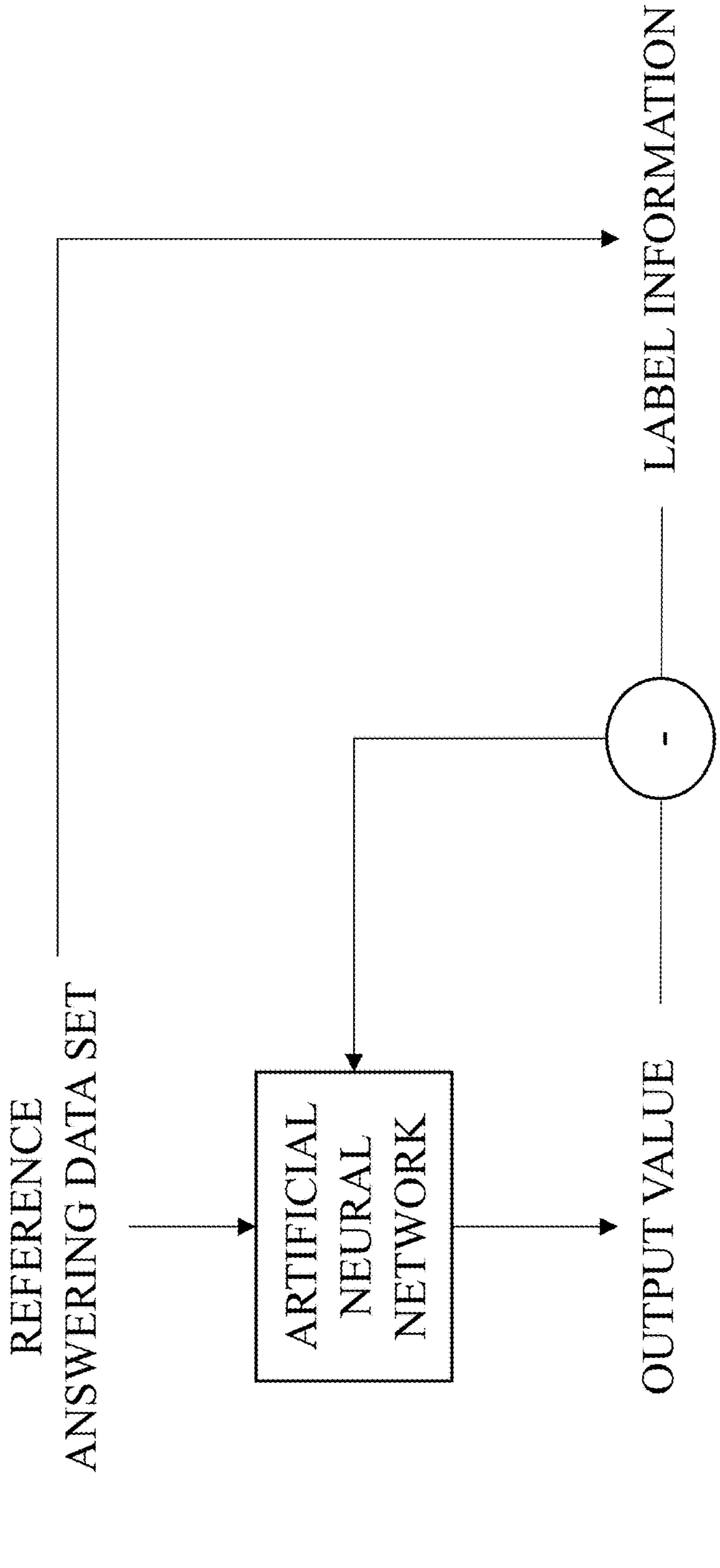
FIG. 6 is a diagram illustrating an aspect of training a first neural network model according to an embodiment of the present application.

Hereinafter, a method of training the first neural network model according to the embodiment of the present application will be described in more detail with reference to FIGS. 5 and 6. FIG. 5 is a flowchart showing details of a method of training a first neural network model according to an embodiment of the present application. FIG. 6 is a diagram illustrating an aspect of training a first neural network model according to an embodiment of the present application.

The first neural network model may include an input layer, an output layer, and a hidden layer including a plurality of nodes connecting the input layer to the output layer.

The training of the first neural network model according to the embodiment of the present application (S1500) may include inputting the reference answering data set to the input layer of the first neural network model (S1510), obtaining an output value related to an uncertainty index through the output layer (S1520), and adjusting the weight of at least one node among the plurality of nodes on the basis of the output value and the label information (S1530).

In the inputting of the reference answering data set to the input layer of the first neural network model (S1510), the learning apparatus 2000 according to the embodiment of the present application may be configured to input the reference answering data set to the input layer of the first neural network model.

In the obtaining of the output value related to the uncertainty index through the output layer (S1520), the learning apparatus 2000 according to the embodiment of the present application may obtain an output value output through the output layer of the first neural network model.

In the adjusting of the weight of the at least one node among the plurality of nodes on the basis of the output value and the label information (S1530), the learning apparatus 2000 according to the embodiment of the present application may train the first neural network model on the basis of a difference between the output value output through the output layer and the label information. Specifically, the learning apparatus 2000 may train the first neural network model by adjusting the weight (or a parameter) of at least one node among the plurality of nodes of the first neural network model on the basis of the difference between the output value output through the output layer and the label information, which is defined as a difference between the expected score information of the reference user and the actual score information of the reference user (or the accuracy of the expected score information of the reference user with respect to the actual score information of the reference user).

In addition, the learning apparatus 2000 may repeatedly perform the above-described learning process to obtain the first neural network model trained such that the output value output through the output layer of the first neural network model approximates the label information.

Referring again to FIG. 4, although not shown in FIG. 4, the method of training the first neural network model according to the embodiment of the present application may include transmitting the first neural network model for which training is completed. Here, the transmitting of the first neural network model involves transmitting arbitrary data required to entirely execute the first neural network model, including execution data for executing the first neural network model and/or weight data of the nodes. For example, the learning apparatus 2000 may transmit the first neural network model to an arbitrary external device including the database 200 and/or the learning skill evaluation apparatus 1000 through an arbitrary transceiver.

Hereinafter, a method of obtaining an uncertainty index using the first neural network model according to the embodiment of the present application will be described in detail with reference to FIGS. 7 and 8. FIG. 7 is a flowchart showing a method of obtaining an uncertainty index according to an embodiment of the present application. FIG. 8 is a diagram illustrating an aspect of obtaining an uncertainty index through a first neural network model according to an embodiment of the present application.

The method of obtaining an uncertainty index according to the embodiment of the present application may include obtaining target answering data of a target user (S2100), obtaining an expected score of the target user (S2200), obtaining a first neural network model (S2300), and obtaining an uncertainty index related to the accuracy of the expected score using the first neural network model (S2400).

In the obtaining of the target answering data of the target user (S2100), the learning skill evaluation apparatus 1000 according to the embodiment of the present application may obtain target answering data of a target user from the user terminal 100 of the target user. Here, the target answering data may include problem data, response data of the target user to the problem data, and/or correct/incorrect answer data of the target user to the problem. In addition, the target answering data may further include problem data, response data and/or correct/incorrect answer data of a reference user to the problem, correct answer rate data of the reference user to the problem, and/or score information of the reference user.

In the obtaining of the expected score of the target user (S2200), the learning skill evaluation apparatus 1000 may calculate an expected score of the target user on the basis of the target answering data.

As an example, the learning skill evaluation apparatus 1000 may obtain the expected score of the target user by using a second neural network model trained to receive an answering data set and output an expected score of a user. Specifically, the learning skill evaluation apparatus 1000 may input the target answering data to an input layer of the second neural network model for which training is completed, and obtain an output value related to an expected score of the target user output through an output layer.

In this case, the second neural network model may be trained by adjusting the weight of at least one node such that a value approximating label information defined as actual score information of the reference user from the reference answering data set is output. Accordingly, the second neural network model, for which the training is completed, may output expected score information of a learner that approximates actual score information of the learner from the target answering data. However, the method of training the second neural network model and the training set may be modified in an arbitrary suitable manner.

In addition, the obtaining of the expected score of the target user using the neural network model is only an example. The learning skill evaluation apparatus 1000 may be configured to calculate the expected score information of the target user using an arbitrary algorithm.

In the obtaining of the first neural network model (S2300), the learning skill evaluation apparatus 1000 according to the embodiment of the present application may obtain a first neural network model for which training is completed. In more detail, the learning skill evaluation apparatus 1000 may obtain arbitrary data required to execute the first neural network model, including execution data of the first neural network model and/or weight data of the plurality of nodes.

In the obtaining of the uncertainty index related to the accuracy of the expected score using the first neural network model (S2400), the learning skill evaluation apparatus 1000 according to the embodiment of the present application may obtain the uncertainty index related to the accuracy (or error) of the expected score of the target user by using the first neural network model for which training is completed. Specifically, the learning skill evaluation apparatus 1000 may input the target answering data and/or the expected score of the target user to the input layer of the first neural network model, and obtain the uncertainty index related to the accuracy (or error) of the expected score of the target user that is output through the output layer.

As described above, the concept of the uncertainty index may be understood to encompass any index quantified in an arbitrary form with respect to the accuracy or error of expected score information of a learner, including a difference (or an error value) between expected score information of the learner and actual score information of the learner, the reliability of the error value, a probability value that the expected score information matches the actual score information, and/or the accuracy of the expected score information.

Since the first neural network model has been trained to output a value approximating label information related to the accuracy of the expected score information of the reference user relative to the actual score information of the reference user on the basis of the reference answering data set of the reference users, the first neural network model may output an uncertainty index indicating the accuracy of the expected score of the target user from the target answering data and the expected score of the target user.

Therefore, the learning skill evaluation apparatus 1000 according to the embodiment of the present application may be configured to, for a new user or a target user who lacks actual score information for a reason such as insufficient existing data, calculate the expected score on the basis of answering data of the target user for a new problem while providing an uncertainty index related to the accuracy of the calculated expected score. With such a configuration, the learning skill evaluation apparatus 1000 disclosed in the present application may provide an effect of ensuring objectivity and reliability of learning skill evaluation information of users.

Figure 7:
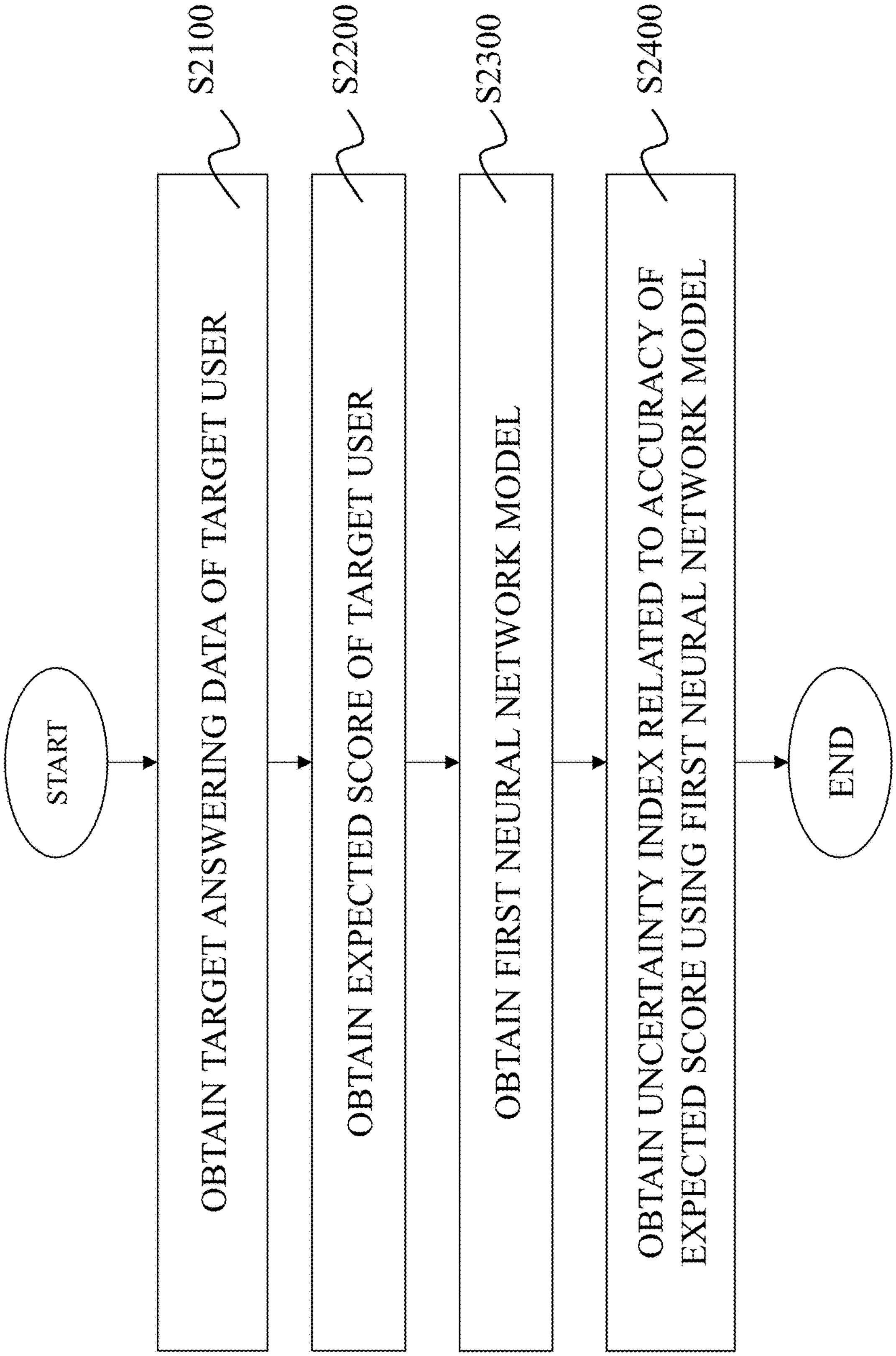
FIG. 7 is a flowchart showing a method of obtaining an uncertainty index according to an embodiment of the present application.
Figure 8:
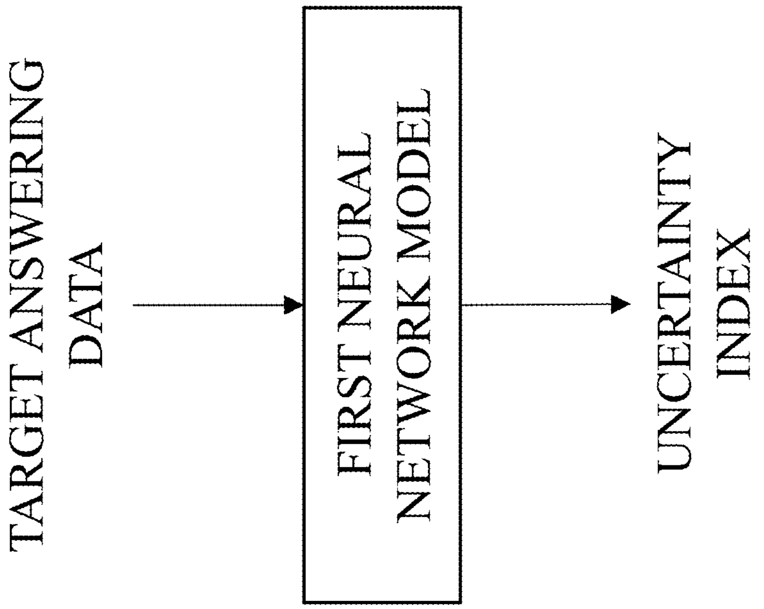
FIG. 8 is a diagram illustrating an aspect of obtaining an uncertainty index through a first neural network model according to an embodiment of the present application.

Meanwhile, although not shown in FIG. 7, the method of obtaining the uncertainty index according to the embodiment of the present application may further include transmitting uncertainty information including the uncertainty index. In the transmitting of the uncertainty information, the learning skill evaluation apparatus 1000 may transmit the uncertainty information (or expected score information) to the user terminal 100 through the transceiver 1100. In addition, the user terminal 100 receiving the uncertainty information may output the uncertainty information to the user through an arbitrary output unit (e.g., a display, a speaker, a monitor, etc.). In this case, outputting the expected score information of the user together with the uncertainty information may have a benefit of providing the user with the objectivity and reliability of the expected score information.

The method of training the first neural network model and the method of obtaining the uncertainty index using the first neural network model have been described above based on the obtaining of the uncertainty index related to the accuracy of the expected score. However, this is only an example, and the uncertainty index is not limited to the expected score as a target.

For example, the learning skill evaluation system 10 according to the embodiment of the present application may calculate an expected correct answer rate of the target user for arbitrary problem data from the target answering data. In this case, the learning skill evaluation system 10 may be modified to output an uncertainty index related to the accuracy (or error) of the expected correct answer rate.

In detail, the learning apparatus 2000 may calculate an expected correct answer rate of a learner to a target problem on the basis of the problem solving history of the learner. In addition, the learning apparatus 2000 may obtain information about an actual result of the learner solving the target problem. In this case, the learning apparatus 2000 may be implemented to train a neural network model that outputs an uncertainty index related to the accuracy of the expected correct answer rate for the target problem on the basis of the expected correct answer rate and the actual solving result. More specifically, the learning apparatus 2000 may train the neural network model to output a value approximating label information defined as the accuracy of the expected correct answer rate relative to the actual solving result on the basis of the reference answering data set.

The learning skill evaluation apparatus 1000 according to another embodiment of the present application may obtain an uncertainty index related to the accuracy of the expected correct answer rate of a target user to a target problem from target answering data of the target user by using the neural network model for which training is completed.

However, the above-described learning method including the training set and label information to train the neural network model for obtaining the uncertainty index related to the expected correct answer rate may be modified into an arbitrary suitable form.

Figure 9:
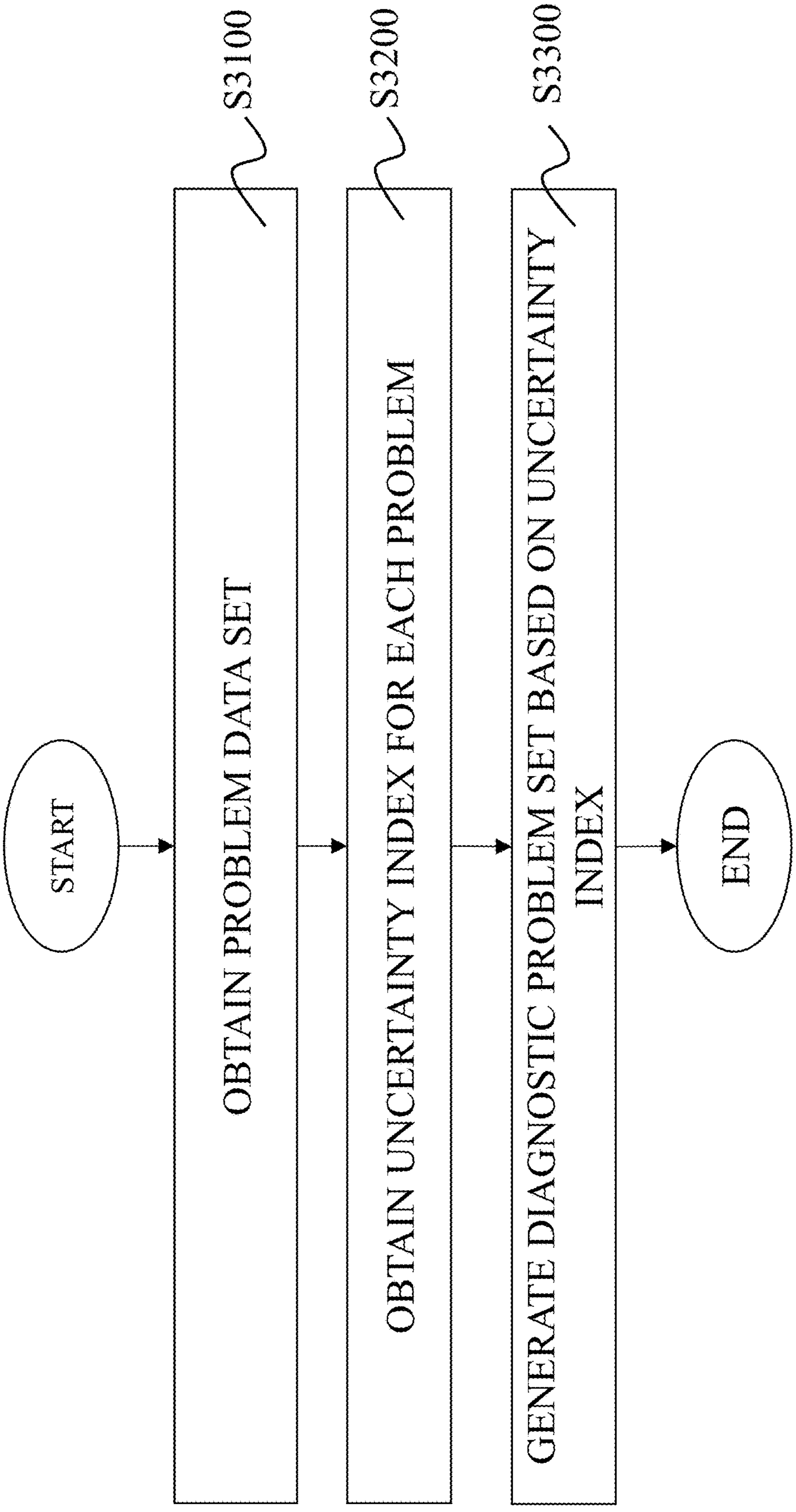
FIG. 9 is a flowchart showing a method of generating a diagnostic problem set on the basis of an uncertainty index according to another embodiment of the present application.

Hereinafter, a method of generating a diagnostic problem set according to another embodiment of the present application will be described in detail with reference to FIG. 9. FIG. 9 is a flowchart showing a method of generating a diagnostic problem set on the basis of an uncertainty index according to another embodiment of the present application.

The method of generating a diagnostic problem set according to the embodiment of the present application may include obtaining a problem data set (S3100), obtaining an uncertainty index for each problem (S3200), and generating a diagnostic problem set on the basis of the uncertainty index (S3300).

In the obtaining of the problem data set (S3100), the learning skill evaluation apparatus 1000 according to the embodiment of the present application may obtain a problem data set stored in the database 200.

In the obtaining of the uncertainty index for each problem (S3200), the learning skill evaluation apparatus 1000 according to the embodiment of the present application may obtain the uncertainty index related to each problem included in the problem data set. For example, the learning skill evaluation apparatus 1000 may obtain an uncertainty index related to the accuracy (or error) of a score expected when a target user solves each problem using the first neural network model. As another example, the learning skill evaluation apparatus 1000 may obtain an uncertainty index related to the accuracy of an expected correct answer rate when a target user solves each problem using the above-described method of calculating an uncertainty index related to an expected correct answer rate.

In the generating of the diagnostic problem set on the basis of the uncertainty index (S3300), the learning skill evaluation apparatus 1000 according to the embodiment of the present application may generate a customized diagnostic problem set for the target user on the basis of the uncertainty index for each problem. In detail, the learning skill evaluation apparatus 1000 may generate a diagnostic problem set including problems for lowering the uncertainty about learning skill evaluation information (e.g., an expected score and/or an expected correct answer rate, etc.) of a learner.

As an example, the learning skill evaluation apparatus 1000 may sort one or more problems included in the problem data set in ascending order of the uncertainty index. In this case, the learning skill evaluation apparatus 1000 may generate the diagnostic problem set on the basis of problems corresponding to an uncertainty index smaller than a preset value. With such a configuration, the learning skill evaluation apparatus 1000 has an effect of providing the user with a diagnostic problem set composed of problems that lower the uncertainty about the learner's learning skill evaluation information (e.g., an expected score and/or expected correct answer rate, etc.)

As another example, the learning skill evaluation apparatus 1000 may generate the diagnostic problem set by additionally considering a difficulty level and/or a skill change rate of at least one problem included in the problem data set. Here, the skill change rate is information that quantifies a change in a user's skill when a problem is provided to a learner.

Specifically, the learning skill evaluation apparatus 1000 may be implemented to assign weights to the difficulty level, the uncertainty index, and/or the skill change rate of problems included in the problem data set, and generate the diagnostic problem set on the basis of a result of weight assignment. For example, when the diagnostic problem set is generated by considering only the uncertainty index, the difficulty levels of the problems included in the diagnostic problem set may be fluctuate. Accordingly, the learning skill evaluation apparatus 1000 may be implemented to primarily select problems included in the problem data set on the basis of the difficulty level or the skill change rate. In addition, the learning skill evaluation apparatus 1000 may secondarily select, among the selected problems, problems corresponding to the uncertainty index smaller than a preset value as described above to finally generate the diagnostic problem set.

However, the above-described method of generating the diagnostic problem set is only an example, and the learning skill evaluation apparatus 1000 may be configured to generate the diagnostic problem set in an arbitrary suitable manner in order to increase the learning effect of the learner.

Meanwhile, although not shown in FIG. 9, the method of generating a diagnostic problem set according to the embodiment of the present application may further include transmitting the diagnostic problem set. In the transmitting of the diagnostic problem set, the learning skill evaluation apparatus 1000 may transmit the diagnostic problem set to the user terminal 100 through the transceiver 1100. In addition, the user terminal 100 receiving the diagnostic problem set may output the diagnostic problem set to the user through an arbitrary output unit (e.g., a display, a speaker, a monitor, etc.).

The learning skill evaluation system 10 according to the embodiment of the present application may more accurately and rapidly calculate the uncertainty about learning skill evaluation information including an expected score or expected correct answer rate of a learner using a neural network model.

In addition, the learning skill evaluation system 10 may calculate not only learning skill evaluation information including an expected score or expected correct answer rate of a learner, but also an uncertainty index indicating the accuracy (or error) of the learning skill evaluation information, and provide the learner with the learning skill evaluation information and the uncertainty index, so that the objectivity and reliability of the learning skill evaluation information may be ensured.

In addition, the learning skill evaluation system 10 may generate a diagnostic problem set on the basis of the uncertainty index. Specifically, the learning skill evaluation system 10 may generate a diagnostic problem set including problems for lowering the uncertainty. Therefore, the learning skill evaluation system 10 may provide an effect of increasing the learning efficiency of the learner.

The various operations of the learning skill evaluation apparatus 1000 described above may be stored in the memory 12000 of the learning skill evaluation apparatus 1000, and the controller 1300 of the learning skill evaluation apparatus 1000 may be provided to perform the operations stored in the memory 1200. In addition, the various operations of the learning apparatus 2000 described above may be stored in the memory of the learning apparatus 2000 and the controller of the learning apparatus 2000 may be provided to perform the operations stored in the memory of the learning apparatus 2000.

Features, structures, effects, etc. described in the above embodiments are included in at least one embodiment of the present invention, and are not limited to only one embodiment. Furthermore, the features, structures, effects, etc. illustrated in each embodiment may be combined or modified for other embodiments by those skilled in the art to which the embodiments belong. Accordingly, the content related to such combinations and modifications should be interpreted as being included in the scope of the present invention.

As is apparent from the above, the learning skill evaluation method, apparatus, and system according to the embodiment of the present application can accurately and rapidly calculate uncertainty about learning skill evaluation information of a learner.

The learning skill evaluation method, apparatus, and system according to the embodiment of the present application can ensure the objectivity and reliability of learning skill evaluation information by providing learning skill evaluation information together with an uncertainty index related to the accuracy of the learning skill evaluation information The learning skill evaluation method, apparatus, and system according to the embodiment of the present application can increase the learning efficiency of a user by generating a diagnostic problem set composed of problems for lowering the uncertainty.

The effects of the present invention are not limited to those described above, and other effects not described above will be clearly understood by those skilled in the art from the above detailed description.

Although the present invention has been described with reference to embodiments, it should be understood by those skilled in the art that the embodiments disclosed above should be considered not for the purpose of limitation and various modifications and applications that are not illustrated above are possible without departing from the essential characteristics of the present embodiments. That is, each component specifically shown in the embodiment may be implemented with modification. Differences related to such modifications and applications should be understood as being included in the scope of the present invention defined in the appended claims.

What is claimed is:

1. A method of training a neural network model for calculating an uncertainty index indicating accuracy of an expected score of a user on the basis of answering data of the user, the method comprising:

obtaining a reference answering data set of a plurality of reference users, the reference answering data set including problem data solved by a reference user of the plurality of reference users and response data of the reference user to the problem data;

obtaining expected score information of the reference user from the reference answering data set wherein the expected score information of the reference user is obtained through a second neural network model trained to calculate the expected score information of the reference user from the reference answering data set, and wherein the second neural network model is trained by adjusting a weight of at least one node of the second neural network model such that the expected score information that approximates actual score information of the reference user is output based on the reference answering data set;

obtaining the actual score information of the reference user, wherein the actual score information comprises an actual test score of the reference user for an educational domain related to the problem data;

obtaining a training set on the basis of the reference answering data set, the expected score information, and the actual score information, the training set including label information that is defined as a difference between the expected score information and the actual score information;

training a first neural network model for calculating an uncertainty index indicating accuracy of the expected score information of the reference user from the reference answering data set by using the training set including the label information;

obtaining target answering data of a target user, the target answering data including problem data previously solved by the target user and response data of the target user to the problem data;

obtaining an expected score of the target user calculated on the basis of the target answering data, wherein the expected score of the target user is obtained through the second neural network model configured to receive the target answering data and output the expected score of the target user;

obtaining an uncertainty index related to accuracy of the expected score of the target user using the first neural network model, wherein the obtaining of the uncertainty index related to the accuracy of the expected score of the target user comprises inputting the target answering data and the expected score of the target user to the first neural network model and obtaining, from the first neural network model, the uncertainty index related to the accuracy of the expected score of the target user; and transmitting the uncertainty index related to the accuracy of the expected score of the target user to a user terminal of the target user, wherein the first neural network model includes an input layer for receiving the reference answering data set, an output layer for outputting a value related to the uncertainty index indicating the accuracy of the expected score information of the reference user, and a hidden layer having a plurality of nodes connecting the input layer to the output layer, wherein the training of the first neural network model comprises:

inputting the reference answering data set to the input layer, outputting the value related to the uncertainty index through the output layer, and adjusting a weight of at least one node among the plurality of nodes based on (i) the value related to the uncertainty index and (ii) the label information defined as the difference between the expected score information of the reference user and the actual score information of the reference user, and wherein the label information is used to adjust the weight of the at least one node among the plurality of nodes of the first neural network model in the training of the first neural network model, and wherein the first neural network model is trained such that the value related to the uncertainty index output through the output layer approximates the label information defined as the difference between the expected score information of the reference user and the actual score information of the reference user.

2. The method of claim 1, wherein the uncertainty index indicating the accuracy of the expected score information of the reference user is provided in a form of at least one of an error value between the expected score information of the reference user and the actual score information of the reference user, a reliability of the error value, and a probability value that the expected score information matches the actual score information.

3. A non-transitory computer-readable recording medium in which a computer program executed by a computer is recorded, the computer program comprising:

obtaining a reference answering data set of a plurality of reference users, the reference answering data set including problem data solved by a reference user of the plurality of reference users and response data of the reference user to the problem data;

obtaining expected score information of the reference user from the reference answering data set, wherein the expected score information of the reference user is obtained through a second neural network model trained to calculate the expected score information of the reference user from the reference answering data set, and wherein the second neural network model is trained by adjusting a weight of at least one node of the second neural network model such that the expected score information that approximates actual score information of the reference user is output based on the reference answering data set;

obtaining the actual score information of the reference user, wherein the actual score information comprises an actual test score of the reference user for an educational domain related to the problem data;

obtaining a training set on the basis of the reference answering data set, the expected score information, and the actual score information, the training set including label information that is defined as a difference between the expected score information and the actual score information;

training a first neural network model for calculating an uncertainty index indicating accuracy of the expected score information of the reference user from the reference answering data set by using the training set including the label information;

obtaining target answering data of a target user, the target answering data including problem data previously solved by the target user and response data of the target user to the problem data;

obtaining an expected score of the target user calculated on the basis of the target answering data, wherein the expected score of the target user is obtained through the second neural network model configured to receive the target answering data and output the expected score of the target user;

obtaining an uncertainty index related to accuracy of the expected score of the target user using the first neural network model, wherein the obtaining of the uncertainty index related to the accuracy of the expected score of the target user comprises inputting the target answering data and the expected score of the target user to the first neural network model and obtaining, from the first neural network model, the uncertainty index related to the accuracy of the expected score of the target user; and transmitting the uncertainty index related to the accuracy of the expected score of the target user to a user terminal of the target user, wherein the first neural network model includes an input layer for receiving the reference answering data set, an output layer for outputting a value related to the uncertainty index indicating the accuracy of the expected score information of the reference user, and a hidden layer having a plurality of nodes connecting the input layer to the output layer, wherein the training of the first neural network model comprises:

inputting the reference answering data set to the input layer, outputting the value related to the uncertainty index through the output layer, and adjusting a weight of at least one node among the plurality of nodes based on (i) the value related to the uncertainty index and (ii) the label information defined as the difference between the expected score information of the reference user and the actual score information of the reference user, and wherein the label information is used to adjust the weight of the at least one node among the plurality of nodes of the first neural network model in the training of the first neural network model, and wherein the first neural network model is trained such that the value related to the uncertainty index output through the output layer approximates the label information defined as the difference between the expected score information of the reference user and the actual score information of the reference user.

* * * * *